(12) United States Patent
Kim

(10) Patent No.: US 6,428,082 B1
(45) Date of Patent: Aug. 6, 2002

(54) TAILGATE MOUNTING STRUCTURE

(75) Inventor: Yong-Soo Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/442,624

(22) Filed: Nov. 17, 1999

(30) Foreign Application Priority Data

Apr. 27, 1999 (KR) .............................................. 99-6980

(51) Int. Cl.$^7$ .................................................. B60J 5/00
(52) U.S. Cl. .................................................. 296/146.7
(58) Field of Search .............................. 296/39.1, 146.7

(56) References Cited

U.S. PATENT DOCUMENTS 4,842,328 A * 6/1989 Zweigart et al.
5,580,116 A * 12/1996 Patel et al.
5,906,409 A * 5/1999 DeRees et al.
5,938,269 A * 8/1999 Sauve
6,123,385 A * 9/2000 Bailey et al.

* cited by examiner

*Primary Examiner*—Joseph D. Pape
*Assistant Examiner*—Scott Carpenter
(74) *Attorney, Agent, or Firm*—Christie, Parker & Hale, LLP

(57) ABSTRACT

A tailgate mounting structure for minimizing vibration of a tailgate formed at a rear end of a vehicle. The structure includes a gate glass where a lower end of the gate glass is coupled to one end of a tailgate panel. The tailgate trim panel includes a rib formed at an extended tip end. The rib includes a coupling portion where each coupling portion is fitted with a sponge pad. The tailgate structure also includes inner and outer tailgate panels where the panels are coupled together and one end of the coupled panels or an extension of the coupled panels is inserted into the rib coupling portion of the tailgate trim panel between the sponge pad.

6 Claims, 4 Drawing Sheets

TAILGATE MOUNTING STRUCTURE

BACKGROUND OF THE INVENTION

The present invention relates to a tailgate mounting structure, and more particularly to a tailgate mounting structure formed at a rear end of a three-door or a five-door passenger car.

DESCRIPTION OF THE PRIOR ART

A three-door or a five-door passenger car is typically formed with a semi-notch type tailgate. The semi-notch type tailgate structure includes a length "L", as illustrated in FIG. 1, which is particularly susceptible to vibration in response to vehicle movement. Details of the structure of the semi-notch type tailgate are described below. The tailgate 1 comprises an outer panel 2, an inner panel 3, a trim panel 4 and a gate glass 5. An upper part of the outer panel and an upper part of the inner panel are coupled together and a lower part of the outer panel and a lower part of the inner panel are also coupled together to make an integral formation. In the exemplary embodiment shown in FIG. 1, the upper part of the outer panel and the upper part of the inner panel are stepped toward each other and their upper end portions are coupled to each other.

One end of the combined inner and outer tailgate panels 2 and 3 is mated to a lower surface of the gate glass 5 while the inner panel of the tailgate 1 is screwed into one side of the trim panel 4, forming a screwed coupling.

However, as described previously, there is a problem with the prior art tailgate structure described above. The problem occurs because the length of tailgate structure "L", defined as the distance from the stepped area of the inner panel 2 to the screwed coupling, as illustrated in FIG. 3, tends to vibrate excessively in response to vehicle movement.

SUMMARY OF THE INVENTION

The present invention is disclosed to solve the aforementioned problem. It is an object of the present invention to provide a tailgate mounting structure where a lower portion of the gate glass is coupled to one end of a tailgate panel. A tip end of a tailgate outer panel and a tip end of a tailgate inner panel are joined together and are coupled to the tailgate trim panel underneath the gate glass. The tailgate trim panel has an extending portion forming a rib. Formed into the rib is a generally U-shaped coupling portion for receipt of the coupled portion of the inner and outer tailgate panels or an extension thereof. Within the coupling portion of each rib is attached a vibration absorbing sponge pad. The coupled portion of the inner and outer tailgate panels is attached to the tailgate trim panel by inserting the joined-portion into the coupling portion of the rib of the trim panel, between the sponge pad.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE PRESENT INVENTION

Figure 1:
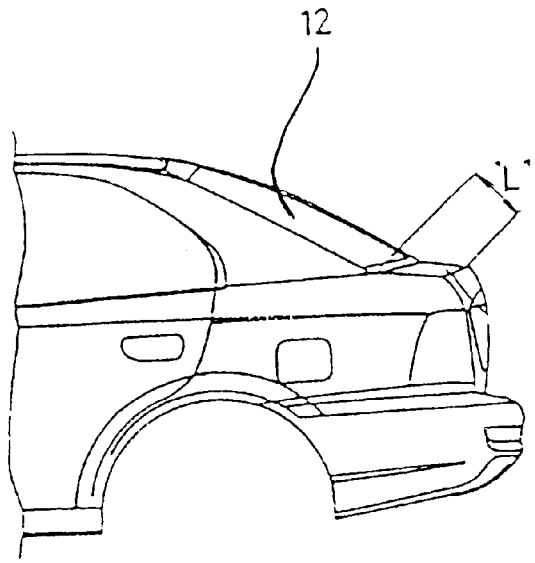
FIG. 1 is a perspective view of a rear end for a 3-door or a 5-door passenger car according to the prior art.
Figure 2:
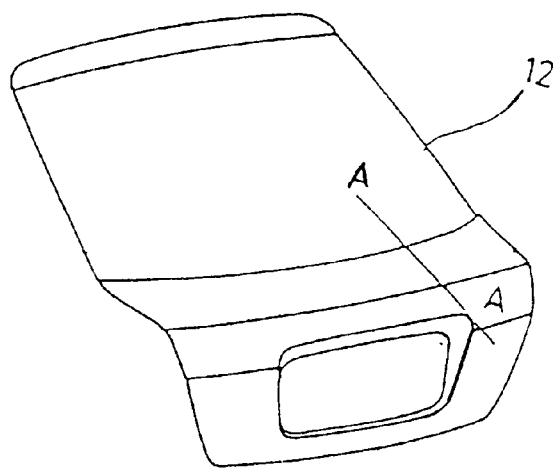
FIG. 2 is a schematical perspective view of a tailgate according to the prior art.
Figure 3:
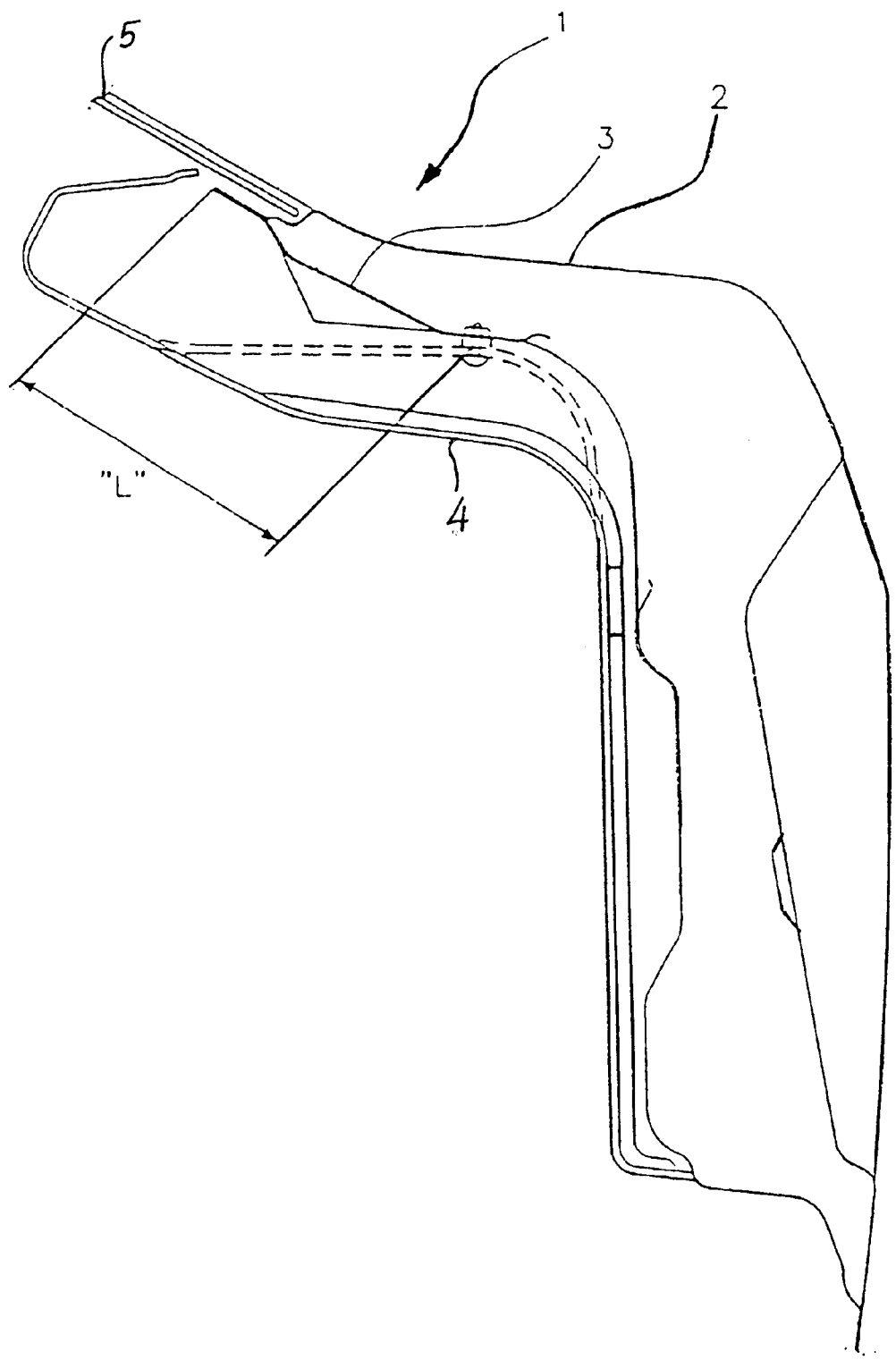
FIG. 3 is a sectional view taken along line A—A in FIG. 2.
Figure 4:
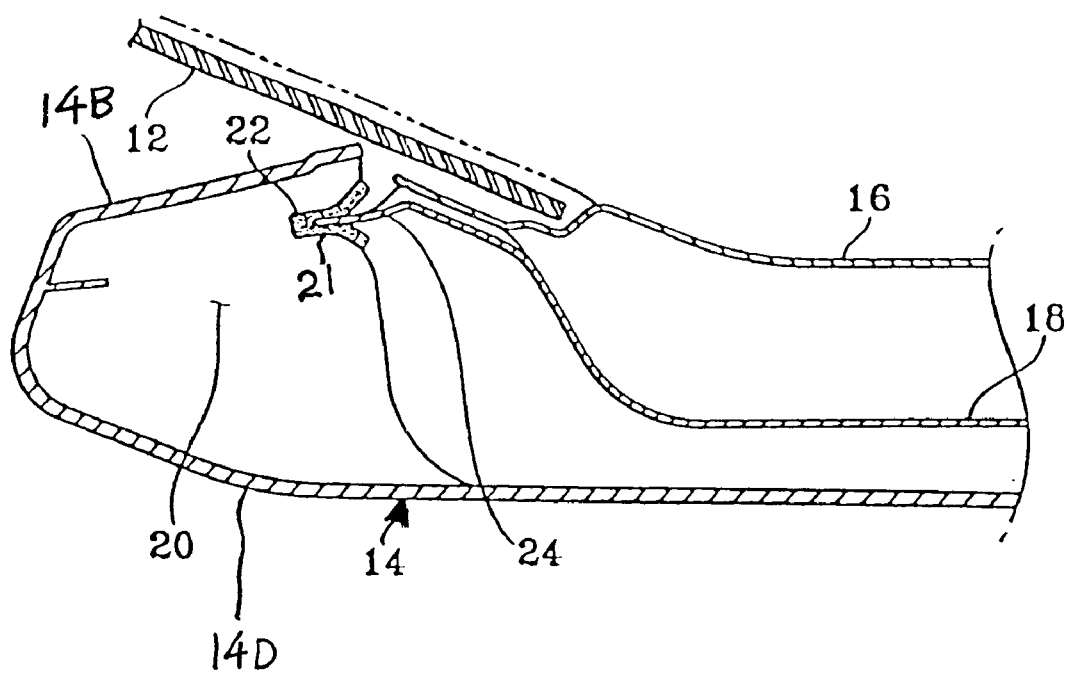
FIG. 4 is a side sectional view of a tailgate according to the present invention.

A preferred embodiment of the present invention will be described in detail with reference to the accompanying drawings. FIG. 4 is a side sectional view of a tailgate according to the present invention.

As illustrated in FIG. 4, a gate glass 12 has disposed thereunder a tailgate trim panel 14 on which a rib 20 is formed. The rib joining an upper portion 14B and a lower portion 14A of the tailgate trim panel. An upper end of the tailgate outer panel 16 and an upper end of the tailgate inner panel 18 are facingly coupled, the coupled part is inserted into a coupling portion 21 of the rib 20. A sponge pad 22 is included between the coupled part and the rib 20 in order to absorb the small vibrations generated by vibration of the body of the vehicle. The sponge pad is preferably installed in the coupling portion 21 of the rib 20 during vehicle assembly.

Figure 5B:
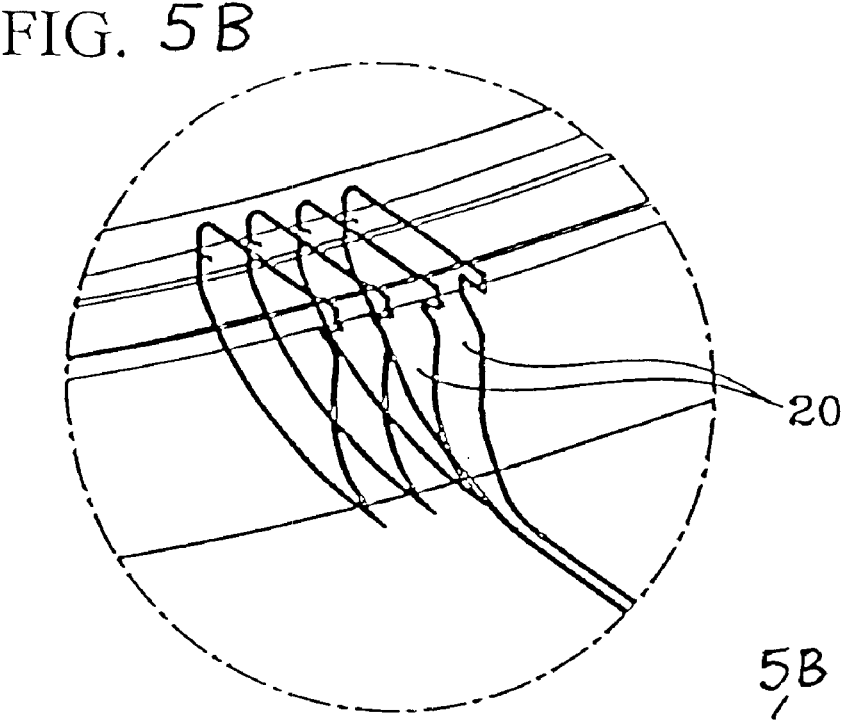
FIG. 5B is an enlarged view of a portion of the tailgate shown in FIG. 5A.
Figure 5A:
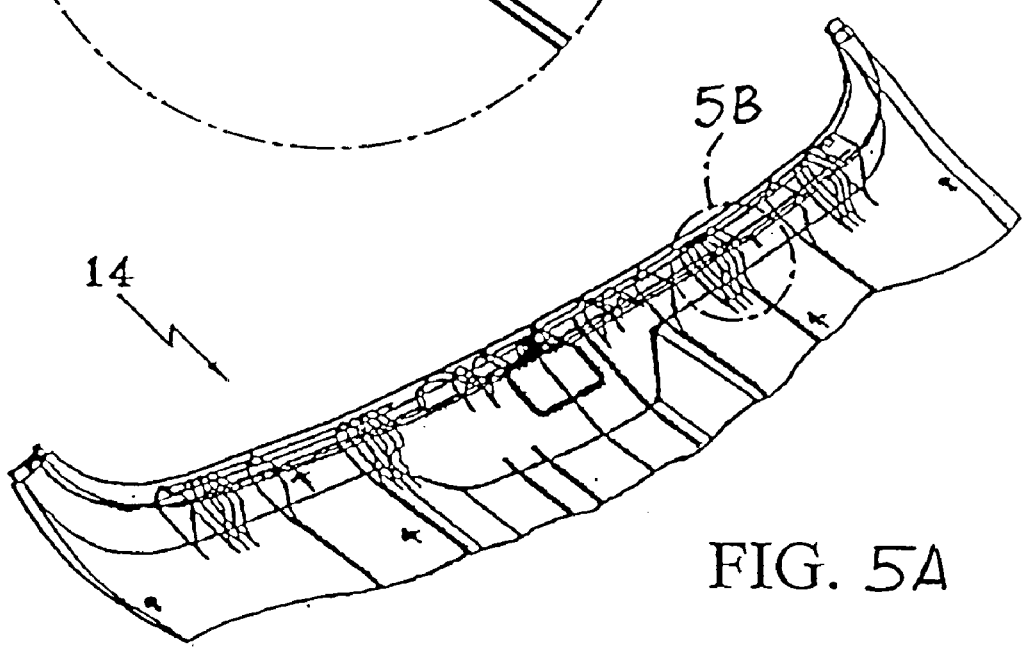
FIG. 5A is a schematic view of a tailgate according to the present invention.

The rib 20 is formed at a tip end of the tailgate trim panel 14, as is illustrated in FIG. 4. A plurality of the ribs 20 may be formed along the tip end of the tailgate trim panel 14 and lengthwise of the tailgate trim panel 14, as shown in FIGS. 5A and 5B.

In comparison to the prior art structures, the tailgate mounting structure of the present invention has an extended tailgate inner panel part 24, as illustrated in FIG. 4. The tailgate trim panel is preferably provided with a plurality of the ribs 20, wherein the coupling portion of each rib 20 receives a sponge pad 22.

As is apparent from the foregoing, the tailgate mounting structure of the present invention prevents the tailgate trim panel from vibrating and thereby attenuates noise that is typically generated by contact between the trim panel and the gate glass during vibration of the vehicle.

What is claimed is:

1. A tailgate mounting structure for a vehicle, the structure comprising:

a rib joining an upper and a lower portion of a tailgate trim panel, wherein the rib includes a coupling portion;

a sponge pad fitted within the coupling portion of the rib;

a tailgate inner panel and a tailgate outer panel, wherein an end of the tailgate inner panel is coupled to an end of the tailgate outer panel forming a coupled part, and wherein the coupled part of the inner and outer tailgate panels is inserted into the coupling portion of the rib of the tailgate trim panel, and wherein the sponge pad is sandwiched between the coupled part and the coupling portion; and a glass, the glass being coupled to the tailgate, wherein the rib and the coupled part of the inner and outer tailgate panel are disposed under the glass.

2. A tailgate mounting structure for a vehicle, the structure comprising:

a plurality ribs joining an upper and a lower portion of a tailgate trim panel, wherein each rib includes a coupling portion;

a sponge pad fitted to the coupling portion of each rib;

a tailgate inner panel and a tailgate outer panel, wherein an upper end of the tailgate inner panel is coupled to an upper end of the tailgate outer panel forming a coupled part, and further wherein the coupled part of the inner and outer tailgate panels is inserted between into the coupling portions of the ribs of the tailgate trim panel, between the sponge pads; and a glass, the glass being mounted at one end to a lower end of the tailgate trim panel, wherein the ribs and the coupled part of the inner and outer tailgate panels attached thereto are disposed under the glass.

3. A tailgate mounting structure for a vehicle, the structure comprising:

a plurality of ribs joining an upper and a lower portion of a tailgate trim panel, wherein the rib includes a coupling portion;

a sponge pad fitted within the coupling portion of the rib;

a tailgate inner panel and a tailgate outer panel, wherein an end portion of the tailgate inner panel is coupled to an end portion of the tailgate outer panel forming a coupled part, wherein a portion of the end portion of one of said inner and outer panels extends beyond the coupled part forming an extending part, wherein the extended part is inserted into the coupling portion of the rib of the tailgate trim panel, and wherein the pad is sandwiched between the coupled part and the coupling portion; and a glass, the glass being coupled to the tailgate structure, wherein the rib and the coupled part of the inner and outer tailgate panel are disposed under the glass.

4. The tailgate of claim 3 wherein the inner panel extends beyond the coupled part forming the extending part.

5. The tailgate of claim 3, wherein the coupling portion is generally U-shaped.

6. The tailgate of claim 5 wherein opposing surfaces of the extended part are covered by the pad.

* * * * *